(12) United States Patent
Jaganathan et al.

(10) Patent No.: US 9,151,837 B2
(45) Date of Patent: Oct. 6, 2015

(54) SENSOR FUSION FRAMEWORK USING MULTIPLE SENSORS TO ASSESS BURIED STRUCTURES

(71) Applicants: Arun Prakash Jaganathan, Ruston, LA (US); Erez N. Allouche, Madison, MS (US)

(72) Inventors: Arun Prakash Jaganathan, Ruston, LA (US); Erez N. Allouche, Madison, MS (US)

(73) Assignee: Louisiana Tech University Research Foundation; a Division of Louisiana Tech University Foundation, Inc., Ruston, LA (US)

( * ) Notice: Subject to any disclaimer, the term of this patent is extended or adjusted under 35 U.S.C. 154(b) by 465 days.

(21) Appl. No.: 13/629,164

(22) Filed: Sep. 27, 2012

(65) Prior Publication Data

US 2013/0082866 A1 Apr. 4, 2013

Related U.S. Application Data

(60) Provisional application No. 61/539,794, filed on Sep. 27, 2011.

(51) Int. Cl.
*G01S 13/86* (2006.01)
*G01S 13/88* (2006.01)
*F16L 55/26* (2006.01)
(Continued)

(52) U.S. Cl.
CPC .............. *G01S 13/88* (2013.01); *F16L 55/26* (2013.01); *G01S 13/885* (2013.01); *G01S 13/0209* (2013.01); *G01S 13/10* (2013.01); *G01S 13/862* (2013.01); *G01S 13/865* (2013.01); *G01S 13/867* (2013.01)

(58) Field of Classification Search
CPC .............. G01S 13/86–13/867; G01S 13/885
USPC ........................................ 342/22, 52–55, 175
See application file for complete search history.

(56) References Cited

U.S. PATENT DOCUMENTS 3,718,978 A * 3/1973 Van Koevering et al. ...... 33/544
4,986,314 A * 1/1991 Himmler .......................... 138/97
5,392,715 A * 2/1995 Pelrine ......................... 104/138.2
(Continued)

FOREIGN PATENT DOCUMENTS

CN 101392642 A 3/2009
WO WO2013/049377 A1 4/2013

OTHER PUBLICATIONS

International Searching Authority, International Search Report and Written Opinion issued in PCT/US2008/074832; Nov. 19, 2008.
(Continued)

*Primary Examiner* — Peter Bythrow
(74) *Attorney, Agent, or Firm* — Jones Walker LLP (57) ABSTRACT

A method of surveying the condition of an underground conduit by positioning a propelled carriage assembly within the underground conduit. The carriage assembly includes (i) at least one transmitter/receiver unit capable of transmitting a pulsed signal toward at least a portion of an inner wall of the conduit, and (ii) a secondary sensor positioned on the carriage assembly. The data derived from the pulsed signal at a given lateral location within an underground conduit is read as is a secondary sensor condition derived from secondary sensor data taken at the given lateral location. Then it is determined whether the secondary sensor condition indicates a basis for a false void detection by the data derived from the pulsed signal and if the basis for false void detection exists, providing an indication of such basis.

27 Claims, 4 Drawing Sheets

(51) Int. Cl.
  *G01S 13/02* (2006.01)
  *G01S 13/10* (2006.01)

(56) References Cited

U.S. PATENT DOCUMENTS

| | | | |
|---|---|---|---|
| 5,742,517 A | 4/1998 | Van Den Bosch | |
| 6,573,721 B1* | 6/2003 | Cull | 324/336 |
| 6,664,914 B2 | 12/2003 | Longstaff et al. | |
| 6,672,409 B1 | 1/2004 | Dock et al. | |
| 6,956,534 B2 | 10/2005 | Hagiwara | |
| 7,131,344 B2* | 11/2006 | Tarumi | 73/865.8 |
| 7,508,336 B2 | 3/2009 | Leskin | |
| 7,539,271 B2 | 5/2009 | Shor et al. | |
| 7,570,063 B2 | 8/2009 | Van Veen et al. | |
| 7,864,870 B2 | 1/2011 | Tekin | |
| 8,041,517 B2* | 10/2011 | Thayer et al. | 702/33 |
| 8,174,443 B2 | 5/2012 | Markus | |
| 8,350,570 B2* | 1/2013 | Allouche et al. | 324/337 |
| 8,952,706 B2* | 2/2015 | Allouche et al. | 324/637 |
| 2003/0090406 A1* | 5/2003 | Longstaff et al. | 342/22 |
| 2004/0183899 A1 | 9/2004 | Shiota | |
| 2005/0115337 A1* | 6/2005 | Tarumi | 73/865.8 |
| 2007/0090989 A1* | 4/2007 | Weil | 342/22 |
| 2008/0068601 A1 | 3/2008 | Thayer et al. | |
| 2010/0237871 A1* | 9/2010 | Allouche et al. | 324/337 |
| 2011/0196534 A1* | 8/2011 | Ekes et al. | 700/259 |
| 2012/0280852 A1 | 11/2012 | Allouche et al. | |
| 2013/0113646 A1 | 5/2013 | Allouche et al. | |
| 2014/0285375 A1* | 9/2014 | Crain | 342/25 A |

OTHER PUBLICATIONS

International Searching Authority, International Preliminary Report on Patentability issued in PCT/US2008/074832, Jan. 22, 2010.

Picosecond Pulse Labs; Real Time Sampling Downconverter Front Ends for Digital Radar and Wide-Band Signaling; Nov. 2004; Boulder Colorado.

PCT Application No. US2012/057604; International Preliminary Report on Patentability for Applicant Louisiana Tech University Research Foundation; a Division of Louisiana Tech University Foundation, Inc., et al. dated Apr. 10, 2014.

Notification of Transmittal of the International Search Report and the Written Opinion of the International Searching Authority, or the Declaration, PCT/US2012/057604, Dec. 27, 2012.

Beam Steerable UWB Radar, U.S. Appl. No. 13/469,454, filed May 11, 2012, Erez Allouche et al.

* cited by examiner

SENSOR FUSION FRAMEWORK USING MULTIPLE SENSORS TO ASSESS BURIED STRUCTURES

This application claims the benefit under 35 USC §119(e) of U.S. provisional application Ser. No. 61/539,794 filed Sep. 27, 2011, which is incorporated by reference herein in its entirety.

BACKGROUND OF THE INVENTION

Buried pipe or conduit systems, e.g., sewer and storm water pipes, culverts, tunnels, etc., deteriorate over time under the action of applied and environmental loads. One important aspect of infrastructure management is the availability of accurate inspection data which allows infrastructure decision makers to provide optimal selection and timely deployment of rehabilitation resources. Inaccurate assessment of the structural integrity of buried pipes and structures can result in spending of hundreds of millions of dollars on replacing non-critical infrastructure elements not in need of immediate repair. On the other hand, the collapse of buried structures, loss of service, environmental spills, damage to adjacent infrastructure (e.g., road surfaces), and in some cases injuries and loss of life, can occur when critical infrastructure repairs are not correctly identified and made. Devices and methods for increasing the accuracy of information derived from pipe and conduit inspections will result in significant cost savings for agencies responsible for infrastructure maintenance.

DETAILED DESCRIPTION OF SELECTED EMBODIMENTS OF THE INVENTION

One embodiment of the present invention comprises a method of surveying the condition of an underground conduit. Typically, a propelled carriage assembly is positioned within an underground conduit and this carriage assembly includes a radar transmitter/receiver unit capable of transmitting a pulsed signal toward the inner wall of the conduit. The carriage assembly will also include one or more secondary sensors. Typically, the propelled carriage assembly will travel down the conduit taking radar and secondary sensor readings at frequent intervals along the length of the conduit. Data on the conduit or surrounding soil is gathered from the radar return signal and the secondary sensors and then this data is cross-correlated to enhance the reliability of data derived from the return radar signal.

Figure 1:
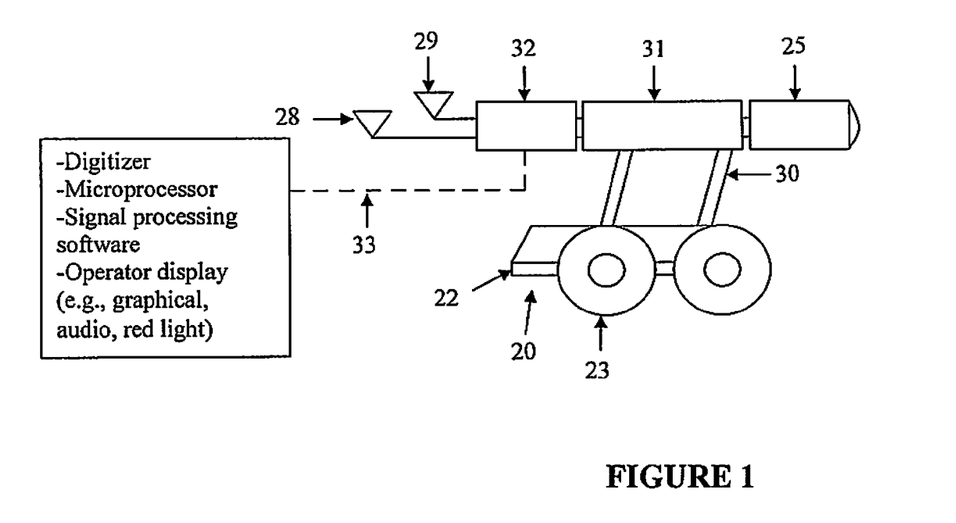
FIG. 1 illustrates one embodiment of a robotic transporter which may be used in conjunction with the present invention.

FIG. 1 illustrates one embodiment of a propelled carriage assembly which could be used in the above described method. The carriage assembly in FIG. 1 is a robotic transporter 20 similar to the Pipe Ranger available from CUES Corporation of Orlando, Fla. Transporter 20 has a frame 22, wheels 23, and a body segment 31 mounted above frame 22 by positioning arms 30. The drive mechanism of transporter 20 may be powered by onboard batteries, a power cord supplying power (e.g., electrical, hydraulic, or pneumatic) from a remote source, or any other conventional or future developed means of powering the drive mechanism. In certain embodiments, body segment 31 will be capable of pivoting forward or rearward on positioning arms 30. Although not shown, a mechanically operated lifting device could operate to raise (pivot forward) and lower (pivot rearward) body segment 31. In some embodiments, the pivoting motion of body segment 31 will be remotely controlled, but in other embodiments, it could be manual (e.g., the body segment 31 is locked into the upright position prior to the transporter entering the conduit). The forward end of body segment 31 may have one or more secondary sensors (e.g., rotating camera 25) and the rearward end may have radar hardware housing 32 positioned thereon. Radar hardware housing 32 will enclose the circuitry associated with the radar such as a microprocessor, digitizer, a pulse generator, a down converter, a low noise amplifier, and possibly an operator display. The housing 32 may be constructed of any appropriate material such as metals, ceramics, thermoplastics, or thermosetting materials. A power/communications cable 33 will extend from housing 32 back to the surface to connect with hardware such as an A/D converter and a microprocessor(s) running signal processing software and graphical software, one example of which is explained in more detail below. The signal carrying component of cable 33 may be coaxial, fiber optic, or other cable type.

In one embodiment, the radar pulse signal will be formed by a transmitter/receiver unit generally comprising a transmitter antenna 29, a receiver antenna 28, and operating circuitry positioned in radar hardware housing 32. In this embodiment, the radar is capable of transmitting a time domain ultra-wide bandwidth (UWB) pulsed signal toward at least a portion of an inner wall of the conduit. One example of the transmitter/receiver unit suitable for this purpose is disclosed in U.S. application Ser. No. 12/675,480 filed Feb. 26, 2010, which is incorporated by reference herein in its entirety. In alternate embodiments, the pulsed signal may be sonic, electromagnetic (including, but not limited to UWB), or any other energy source capable of obtaining useful information regarding the condition of the conduit or the environment surrounding the conduit.

While the secondary sensor illustrated on robotic transporter 20 is a rotating video camera, the secondary sensor could also be any conventional or future developed device for sensing or measuring a condition or parameter in the environment proximate to the sensor. Nonlimiting examples of secondary sensors may include in addition to visual imaging sensors (e.g., still or video cameras), laser profile sensors, tilt sensors, distance sensors (e.g., wheel rotation encoders), or sonar-based sensors. The robotic transporter may include a single secondary sensor or may carry multiple secondary sensors detecting different parameters and conditions present in the particular application environment being surveyed. Visual sensors collect visual images from which may be identified conduit conditions such as cracks, fractures, joints, root intrusion, conduit wall collapse, the intersection of lateral or side connecting conduits, and many others recognized by those skilled in the art. Distance encoders may measure the distance traveled by the robotic transporter allowing other data to be associated with or "tagged" to a particular location along the length of the conduit. Laser profilers may be employed to measure the inner profile of the pipe while UWB radar is capable of locating soil voids outside the pipe wall and corrosion within the pipe.

One of the method embodiments for surveying the condition of an underground conduit begins with positioning a propelled carriage assembly (e.g., a robotic transporter) within an underground conduit. The data derived from the pulsed signal at a given lateral location within an underground conduit is read together with one or more secondary sensor conditions derived from secondary sensor data taken at the given lateral location. Then it is determined whether the secondary sensor condition indicates a basis for a false void detection by the data derived from the pulsed signal and if the basis for false void detection exists, providing an indication of such basis.

In many embodiments, data from the UWB radar is also recorded simultaneously with other sensor information at close intervals. For example, A-scans (i.e., a single trace of radar signal measured at a particular location) may be collected at 0.25 inch increments along the length of the conduit. The A-Scan data are converted into B-scans (i.e., a two dimensional image formed by a collection of A-scan traces measured over a distance) and background subtraction algorithms are applied to remove the radar cross-talk and other background information. Several back ground subtraction techniques including moving average, moving median, high pass filter, and weighted moving average method may be employed. Weighted moving average background subtraction algorithm is given by the equation:

$$W_n(t_i) = \frac{\sum_{k=0}^{n} A_k(t_i)}{A_k(t_i)}, n \in \text{window}$$

wherein Wn is weight applied to the i-th data sample of the n-th A-scan, $t_i$ is time of the i-th data sample, and $A_k$ is the A-scan amplitude.

In this embodiment, raw B-scan data from the UWB radar is background subtracted using weighted moving average filter. The background subtracted image contains the target information, which is identified using feature extraction algorithms. For example, pipe joints and soil voids resemble parabolas, and may be identified using a Hough parabola detector.

Figure 2:
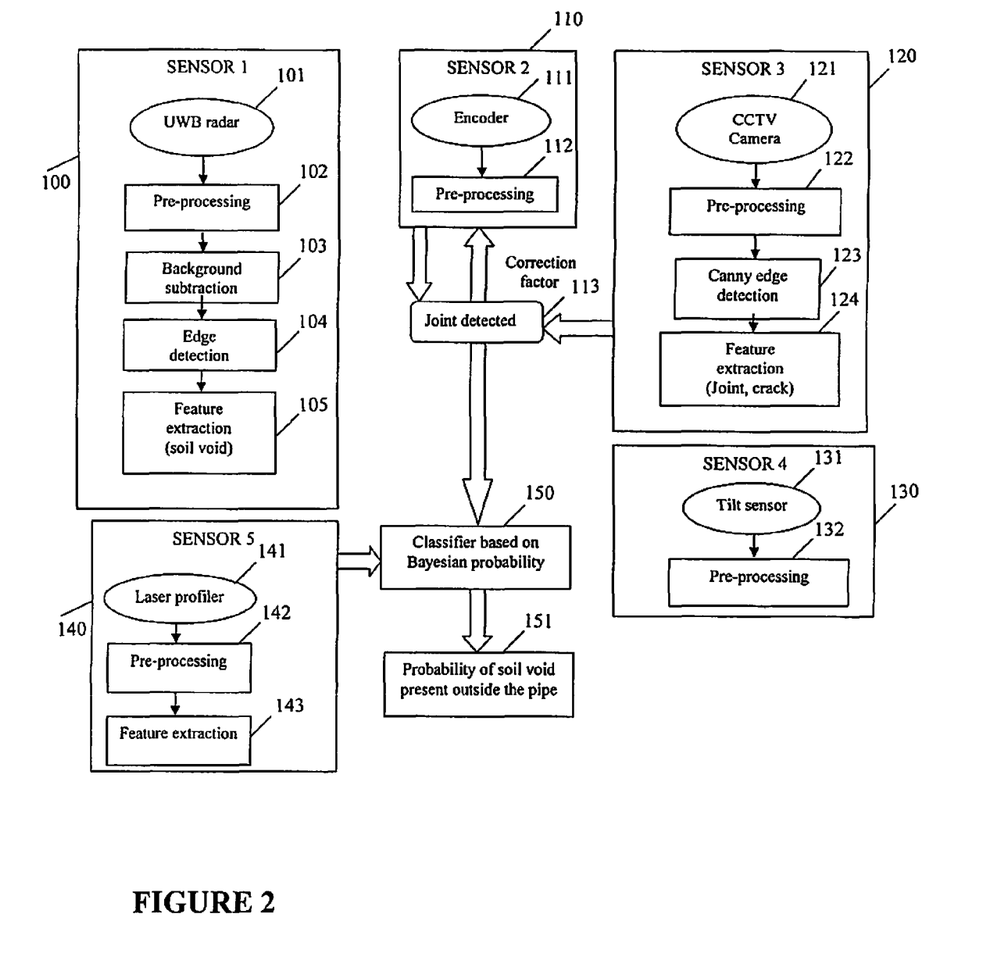
FIG. 2 is a chart of one decision level sensor fusion algorithm using five sensor types.

FIG. 2 illustrates one example decision-level algorithm for condition assessment of a sewer pipe using five sensor types. The first sensor 100 may be UWB radar 101 which receives the return UWB signal reflected from the conduit walls, soil, and other surrounding structures and conditions. The return UWB signal is first pre-processed at step 102 with conventional procedures such as amplitude scaling and time shifting to align all the A-Scans into a proper form. Next in step 103, a background subtraction technique, which in one example is a weighted mean average method, is performed on the return signal. Then in step 104, edge detection is carried out, which in the FIG. 2 example, is accomplished with a conventional Canny algorithm. Finally, in step 105, feature extraction is used to identify the potential artifact suggested by the return signal (e.g., a void in the soil just outside the conduit wall). An example of feature extraction would include application of a Hough transform to identify the presence of parabolas and circles. Return signals from soil voids often resemble a parabola in the B-scan.

A second sensor 110 may be the encoder 111 which determines travel distance of the robotic transporter along the conduit length (e.g., through monitoring the number of turns of the transporter wheels). The encoder data is pre-processed in step 112 by converting electronic data from the sensor readings to distance information and a final estimate of travel distance determined. A third sensor 120 may be closed circuit television (CCTV) camera 121. The camera data is pre-processed in step 122 by a conventional software package such as OpenCV available from Intel Corporation in order to locate the presence of joints and other defects such as cracks [a1]. In step 123, the camera images are passed through an edge detection algorithm (e.g., a Canny algorithm) to convert the images into gray scale, highlighting the edges. In step 124, feature extraction is carried by techniques such as Hough transforms and other template matching algorithms being applied on images containing edges in order to identify the particular features which may be present in the conduit. As one example, a pipe joint present in the images may be identified using a Hough circle detection method.

A fourth sensor 130 may be the tilt sensor 131 which determines any tilt angle of the robotic transporter. The tilt sensor data is pre-processed in step 132 by converting raw sensor data to angular measurement units and a final estimate is made of any tilt angle the transporter is experiencing at the time of reading. A fifth sensor 140 may be the laser profiler 141 which determines the circularity of the conduits inner surface. The laser profile data is pre-processed in step 132 by converting raw sensor data to distance measurement units and a final estimate of any conduit circumference distortion is determined. The data from the various sensors may be cross-correlated to enhanced the certainty of what features or conditions have or have not been detected. For example, step 113 in FIG. 2 compares what is identified as a joint or crack feature by camera 121 to the position information determined from encoder 111. In many instances, the encoder data may contain errors because of the slippage of wheels or other factors. In certain embodiments, the encoder data may be calibrated or corrected by automatically detecting conduit joints since the length of the conduit between joints is typically known and systematically repeats (e.g., detecting a joint every ten feet). Thus, a correction factor may be generated by comparing encoder readings to detected conduit joints. If the encoder reading suggests the camera image is being taken at a lateral distance along the conduit where a joint between conduit sections is expected, then there is an increase probability that a joint in the conduit has been detected rather than a crack in the conduit. Likewise, tilt sensor information, laser profile information, and joint detection probability may be used in a classifying algorithm 150 (e.g., Bayesian probability) to assess the probability of the UWB radar accurately detecting a void in the soil surrounding the conduit.

As further nonlimiting examples, camera 212 may identify features which act as indicators regarding the condition of the environment exterior to the conduit; e.g., discontinuities in the conduit wall allow bedding material to enter into the conduit and create voids in the area around the exterior of the conduit. Likewise, the optimum performance the UWB radar occurs when the radiating surface is in line with the longitudinal axis of the conduit. Thus rolling and tilting of the transporter within the conduit (e.g., as it climbs over debris within the conduit) can introduce noise in the radar data; knowing the orientation of the transporter using tilt sensors allows the system to discriminate such noise from actual features of interest. Noise in the radar return signal may also be introduced by the conduit's uneven inner surface or surface roughness. Employing data from the camera and laser profiler can provide knowledge of these conditions allowing the system to anticipate the noise or ignore artifacts introduced by these degraded conduit surface conditions.

Similarly, gaps at the conduit section joints resemble soil voids in radar data and thus knowledge regarding joint location allows distinguishing a soil void from a joint when analyzing the UWB data. Such joints may be identified using an automated image processing algorithm(s) which process the video images from the camera. Further, false positive indications of joints obtained from image analysis of the video can be reduced by comparing to data from the distance encoder as the length of individual pipe segments is in many cases (e.g., pre-cast concrete, vitrified clay pipe) are a fixed, known quantity along the longitudinal axis of the pipe.

Figure 3:
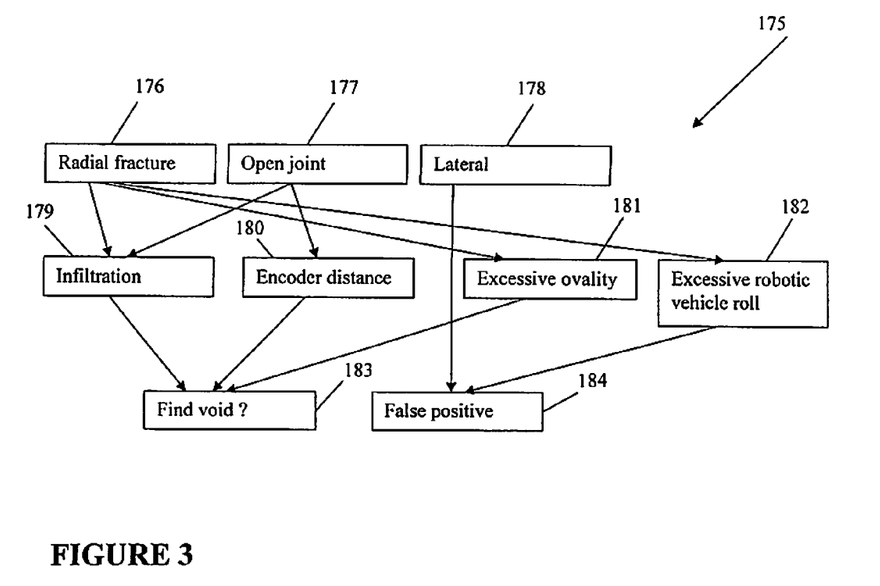
FIG. 3 is a generalized chart suggesting one Bayesian network for sensor fusion.

Once features are identified from individual sensors and their corresponding probabilities estimated, a decision level classifier based on Naive Bayes may be employed to obtain a combined probability of the occurrence of the features. Naive Bayesian rules are based on Bayesian probability theory. Conditional probabilities from individual sensors are related using a dynamic Bayesian learning network for carrying out the classification. FIG. 3 shows one example of a Bayesian network 175 where the nodes in the top layer represents the condition of pipe's interior as seen using a CCTV camera, e.g., radial fracture 176, open joint 177 and lateral connection 178. Infiltration 179 of ground water (as detected by camera images) may also act as condition indicating a broken or ruptured conduit. The second layer in the network represents the data from various sensors, such as a tilt sensor (excessive vehicle roll 182), encoder (encoder distance 180) and laser profiler (excessive ovality 181), which may be used to merge the camera information with the data from the UWB radar. In the third layer, decisions are made regarding the presence 183 or absence 184 of soil void outside the conduit using data from the UWB radar and evidence obtained from previous nodes. Thus in a Bayesian network, evidence from individual nodes propagates through the layers to obtain the probabilistic conclusion about any other node.

Figure 4:
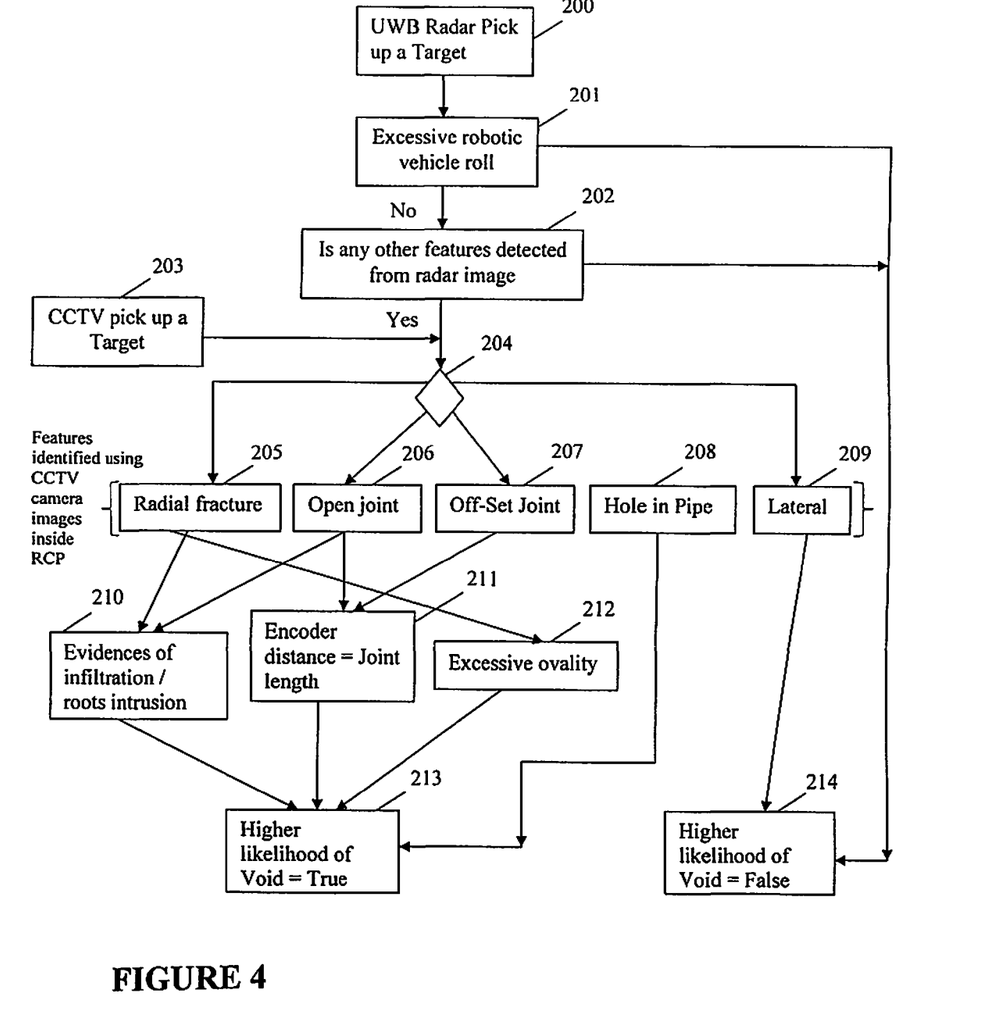
FIG. 4 is a chart of another example of a Bayesian network for sensor fusion in an RCP pipe.

FIG. 4 suggests a series of steps for implementing a more specific example of a Bayesian-type network for integrating sensor information as applied in a reinforced concrete conduit. The method is initiated at 200 when the radar return signal suggests a possible condition of interest (or target, e.g., a void in conduit bedding soil) exists at the lateral location where the signal was propagated. The method checks for excessive robotic transporter roll via the tilt sensor in step 201. If there is excessive vehicle roll, the decision is returned that there is a higher likelihood that the indication of a void in the soil is false. If there is no indication of excessive roll, the method determines whether any other features are detected from the radar image in step 202. Often, a void is form in the soil where there is a defect in the conduit wall, thus other defect-indicating features are common when a void is present. The failure to detect any other unusual features at the location of suspected void increases the likelihood that the suspected void detection is false. If the radar image suggests other features may be present, feature indications 203 based upon process camera image data at that location are considered in step 204. Certain image detected features such as a radial fracture 205, an open joint 206, or an off-set joint 207 can be further correlated with further sensor readings to heighten the likelihood of an actual conduit defect existing. For example, the likelihood of a radial fracture 205 is increased if there is evidence of root intrusion 210 as identified from camera images or if the laser profiler reading indicates excessive ovality 212 of the conduit section. Similarly, if the open joint 206 or off-set joint 207 corresponds to encoder distance data 211 indicating the suspected defect corresponds to where a joint should be between two adjacent conduit sections, then this increases the likelihood of that an open joint or offset joint does in fact exist. All of these conditions increase the likelihood that bedding soil is escaping into the conduit and that a true void exists adjacent to the conduit as suggested at 213. Other image detected conditions, such as a hole 208 in the sidewall of the conduit, are not positively indicated by conditions such as joint existence or excessive ovality, but nonetheless suggest a higher likelihood of true void detection. Contrarily, other image detected conditions, such as the existence of a lateral line being connected to the conduit at the location of interest, would suggest that the void indication suggested by radar data is more likely false.

Naturally FIG. 4 provides just a few illustrative examples of the types of sensor detected features which could be correlated to provide a higher or lower probability of a certain conduit condition. The type of sensor detected feature which may be relevant can vary for different types of conduits. For example, if the conduit is a brick sewer pipe, image data may be processed to detect features such as missing brickwork, missing mortar, or collapsed brick.

In certain embodiments of the invention, the determination of whether the secondary sensor condition indicates a basis for false void detection is made while the carriage assembly (robotic transporter) is in the conduit and taking sensor readings, essentially an on-the-fly determination. In other embodiments, the determination of whether the secondary sensor condition indicates a basis for false void detection is made based upon recorded data at some time after the robotic transporter has carried out the conduit survey.

Often, the transmitter/receiver unit will obtain UWB signal data and the secondary sensor obtain sensor data while the carriage assembly remains in substantially the same position. However, it is also possible that UWB signal data may be obtained at one period and then secondary sensor data (e.g., visual image data) obtained at another time and possibly with a different robotic transporter. The UWB signal data and secondary sensor data may be correlated at a later time based upon the distance encoder reading associate with each.

Although many above embodiments have described a robotic transporter and various sensor types, the invention is not limited to methods employing such hardware. A further embodiment of the invention includes a computer system for analyzing radar data and secondary sensor data obtain from an underground conduit or even another type of structure where radar data and secondary sensor data may be relevant. Likewise, the invention is not limited to a computer system, but also includes software carrying out the sensor correlation functions described above, independent of any particular computer hardware.

Another embodiment of the invention comprises a method of surveying the condition of an underground conduit. A propelled carriage assembly is positioned within an underground conduit, wherein the carriage assembly comprises (i) at least one transmitter/receiver unit capable of transmitting a pulsed signal toward at least a portion of an inner wall of the conduit, and (ii) a secondary sensor is positioned on the carriage assembly. The data derived from the pulsed signal at a given lateral location within an underground conduit is read as is a secondary sensor condition derived from secondary sensor data taken at the given lateral location. Then it is determined whether the secondary sensor condition indicates a basis for a false void detection by the data derived from the pulsed signal and if the basis for false void detection exists, providing an indication of such basis. In alternate embodiments, the pulsed signal may be sonic, electromagnetic (including, but not limited to UWB), or any other energy source capable of obtaining useful information regarding the condition of the conduit or the environment surrounding the conduit.

A further embodiment of the invention includes a computer system for analyzing radar data from an underground conduit. The computer system including a processor, memory, a user interface, and software instructing the computer system to perform the steps of: (a) reading the data of a radar scan at a given lateral location within an underground conduit; (b) if the radar scan indicates a void detection, then reading a secondary sensor condition at the given lateral location; (c) determining whether the secondary sensor condition indicates a basis for a false void detection by the radar scan; and (d) if the basis for false void detection exists, providing an indication of possible false void condition.

We claim:

1. A method of surveying the condition of an underground conduit comprising:
   a. positioning a propelled carriage assembly within an underground conduit, the carriage assembly comprising:
      i. at least one transmitter/receiver unit capable of transmitting a time domain UWB pulsed signal toward at least a portion of an inner wall of the conduit;
      ii. a secondary sensor positioned on the carriage assembly;
   b. reading data derived from the UWB signal at a given lateral location within an underground conduit;
   c. reading a secondary sensor condition derived from secondary sensor data taken at the given lateral location;
   d. determining whether the secondary sensor condition indicates a basis for a false void detection by the data derived from the UWB signal;
   e. if the basis for false void detection exists, providing an indication of such basis.

2. The method of claim 1, wherein the determination of whether the secondary sensor condition indicates a basis for false void detection is made while the carriage assembly is in the conduit.

3. The method of claim 1, wherein the transmitter/receiver unit obtains UWB signal data and said secondary sensor obtains sensor data while the carriage assembly remains in substantially the same position.

4. The method of claim 1, wherein:
   i. the carriage assembly further includes a distance encoder for determining the carriage assembly's lateral position along the conduit; and
   ii. the UWB signal data and the secondary sensor data are associated with the same encoder determined location.

5. The method of claim 4, wherein the indication that a basis for false void detection exists is provided after the carriage assembly has left the encoder determined location where UWB signal data and the secondary sensor data are taken.

6. The method of claim 1, wherein the secondary sensor condition is one of the group consisting of surface discontinuity detection from image data, excessive tilt detection from a carriage roll data, and profile irregularity detection from laser profile data.

7. The method of claim 1, wherein the basis for false void detection is one or more of conduit cracks/fractures, conduit joints, conduit root intrusion, conduit collapse, open conduit joints, or off-set conduit joints.

8. The method of claim 1, wherein the sensor condition is derived from applying a feature detection algorithm to the sensor data.

9. The method of claim 1, wherein the secondary sensor is a visual imaging device.

10. The method of claim 9, wherein a feature detection algorithm is applied to the visual imaging data.

11. The method of claim 10, wherein the feature detection algorithm analyzes the visual imaging data for one or more of conduit cracks/fractures, conduit joints, conduit root intrusion, conduit collapse, open conduit joints, and off-set conduit joints.

12. The method of claim 10, wherein if (i) the feature detection algorithm indicates an open joint or an off-set joint, and (ii) an encoder distance indicates an expected pipe joint, then providing an indication of a higher likelihood of void being present.

13. The method of claim 10, wherein if (i) the feature detection algorithm indicates a radial fracture, and (ii) a profile sensor indicates excessive ovality, then providing an indication of a higher likelihood of void being present.

14. The method of claim 1, wherein the determination of whether the secondary sensor condition indicates a basis for a false void detection is made by a processor onboard the carriage assembly.

15. The method of claim 1, further comprising the steps of (i) determining whether the secondary sensor condition indicates a basis for true void detection by the data derived from the UWB signal; and (ii) if the basis for true void detection exists, providing an indication of such basis.

16. The method of claim 6, wherein the surface discontinuity detected is one or more of conduit cracks/fractures, conduit joints, conduit root intrusion, conduit collapse, open conduit joints, and off-set conduit joints.

17. The method of claim 1, wherein the secondary sensor condition is an ovality determination measured by identification of shape of a laser light ring projected on the pipe and recorded by a visual imaging device and image data is analyzed using a shape fitting algorithm.

18. The method of claim 1, wherein the secondary sensor condition is a lateral connection determined by the existence of a discontinuity in a laser projection on the pipe which is recorded by a visual imaging device.

19. The method of claim 1, wherein the secondary sensor condition is travel distance as determined by an encoder measuring carriage wheel turns and encoder readings are corrected by comparing against the distance traveled by the carriage between consecutive pipe joints as detected by a visual imaging device.

20. The method of claim 1, wherein the secondary sensor condition is an offset joint which is indicated by a tilt sensor detecting a tilt in the carriage assembly as it crosses a joint and a visual imaging device detecting the offset joint.

21. The method of claim 1, wherein the secondary sensor condition is a pipe joint identified as a circle/ellipse in visual imaging device data.

22. The method of claim 1, wherein the secondary sensor condition is a pipe wall crack detected by using visual imaging data and applying image segmentation analysis and linear filter techniques to the data in order to automatically identify the wall crack.

23. The method of claim 1, wherein the secondary sensor condition is a collapsing pipe detected by recording visual image data of a laser ring shape and using template matching techniques to identify the collapsing pipe.

24. The method of claim 1, wherein the secondary sensor condition is a soil void identified using pattern matching techniques in radar image data.

25. The method of claim 1, wherein the secondary sensor condition detected is pipe wall thickness identified by analyzing a time of travel by an electromagnetic pulse of the UWB signal between a inner and outer sheath of the pipe wall.

26. A method of surveying the condition of an underground conduit comprising:

a. positioning a propelled carriage assembly within an underground conduit, the carriage assembly comprising:
  i. at least one transmitter/receiver unit capable of transmitting a time domain pulsed signal toward at least a portion of an inner wall of the conduit;
  ii. a secondary sensor positioned on the carriage assembly;
b. reading data derived from the time domain signal at a given lateral location within an underground conduit;
c. reading a secondary sensor condition derived from secondary sensor data taken at the given lateral location;
d. determining whether the secondary sensor condition indicates a basis for a true void detection by the data derived from the time domain signal;
e. if the basis for true void detection exists, providing an indication of such basis.

27. A method of surveying the condition of an underground conduit comprising:

a. positioning a propelled carriage assembly within an underground conduit, the carriage assembly comprising:
  i. at least one transmitter/receiver unit capable of transmitting a pulsed signal toward at least a portion of an inner wall of the conduit;
  ii. a secondary sensor positioned on the carriage assembly;
b. reading data derived from the pulsed signal at a given lateral location within an underground conduit;
c. reading a secondary sensor condition derived from secondary sensor data taken at the given lateral location;
d. determining whether the secondary sensor condition indicates a basis for increased likelihood of either true or false void detection by the data derived from the pulsed signal.

* * * * *